(12) United States Patent
Stultz

(10) Patent No.: US 8,774,235 B2
(45) Date of Patent: Jul. 8, 2014

(54) SYSTEM AND METHOD FOR SUPPRESSING PARASITICS IN AN OPTICAL DEVICE

(75) Inventor: Robert D. Stultz, Cypress, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/167,568

(22) Filed: Jun. 23, 2011

(65) Prior Publication Data

US 2012/0327962 A1 Dec. 27, 2012

(51) Int. Cl.
H01S 3/067 (2006.01)

(52) U.S. Cl.
USPC .................................. 372/6; 372/68; 372/70

(58) Field of Classification Search
USPC ........................................................ 372/68, 6
See application file for complete search history.

(56) References Cited

U.S. PATENT DOCUMENTS

| 4,217,382 | A | | 8/1980 | Toratani |
| 4,757,268 | A | | 7/1988 | Abrams et al. |
| 4,918,703 | A | | 4/1990 | Kukla |
| 5,508,235 | A | | 4/1996 | Marker |
| 5,771,252 | A | * | 6/1998 | Lang et al. ...................... 372/20 |
| 5,790,722 | A | * | 8/1998 | Minden et al. ................... 385/27 |
| 5,926,494 | A | | 7/1999 | Pepper |
| 6,049,415 | A | * | 4/2000 | Grubb et al. ................ 359/341.1 |
| 6,181,465 | B1 | * | 1/2001 | Grubb et al. ................... 359/337 |
| 6,587,488 | B1 | | 7/2003 | Messinger et al. |
| 6,904,069 | B2 | | 6/2005 | Honea et al. |
| 6,996,137 | B2 | | 2/2006 | Byren et al. |
| 7,065,121 | B2 | | 6/2006 | Filgas et al. |
| 7,526,167 | B1 | | 4/2009 | Minelly |
| 2002/0030881 | A1 | | 3/2002 | Nilsson et al. |
| 2003/0095578 | A1 | * | 5/2003 | Kopp et al. ........................ 372/6 |
| 2003/0152115 | A1 | * | 8/2003 | Jiang et al. ........................ 372/6 |
| 2003/0169489 | A1 | | 9/2003 | Jiang et al. |
| 2004/0131091 | A1 | | 7/2004 | Myers et al. |
| 2009/0074013 | A1 | * | 3/2009 | Rice ................................... 372/6 |

FOREIGN PATENT DOCUMENTS

WO 2010056253 A1 5/2010

* cited by examiner

Primary Examiner — Xinning Niu
(74) Attorney, Agent, or Firm — Burns & Levinson LLP; Joseph M. Maraia

(57) ABSTRACT

An optical device, a method of making a laser gain medium, and a method of suppressing parasitics in a laser device include a core region comprising a plurality of a first type of ions that absorb energy at a first wavelength and transfer the absorbed energy to a plurality of a second type of ions that lase at a second wavelength after receiving the transferred energy. A cladding region coupled to the core region comprising another plurality of the second type of ions that suppress parasitics in the optical device by absorbing energy of at least a transverse portion of the second wavelength that enters the cladding region.

27 Claims, 7 Drawing Sheets

SYSTEM AND METHOD FOR SUPPRESSING PARASITICS IN AN OPTICAL DEVICE

FIELD

The present disclosure relates to generally to an optical device, and particularly to systems and methods for suppressing parasitics in a co-doped gain medium.

BACKGROUND

Generally, parasitics in an optical device (e.g., a laser device) refer to phenomena that act to clamp or limit useful gain (e.g., longitudinal gain) within a gain medium of the optical device, for example, due to internal reflections. In many cases, parasitic optical rays undergo total internal reflection (TIR) within the gain medium and continuously loop around and increase in power (robbing useful gain) with virtually no loss. In one conventional approach, parasitic suppression is accomplished by using an E-wave coating directly on the gain medium that limits the numerical aperture (NA) of the gain medium. The E-wave coating must then be processed in some way on its outer surface to prevent parasitic rays from returning back into the gain medium (e.g., roughening the outer surface of the coating). These processes add cost and complexity to the overall design. Roughening the gain medium surface alone (without an E-wave coating) has been tried, but this greatly increases the scattering loss of the guided pump light, which is highly undesirable as it reduces pump energy. Another conventional approach involves use of an optical adhesive with a refractive index sufficient to limit the gain medium NA. Typically, the adhesive is used to secure the gain medium to a heat-sink and therefore, is applied on the cooling surfaces of the gain medium. It is not convenient to use this adhesive on surfaces not involved in cooling or mounting. Another issue with optical adhesives is their high coefficient of thermal expansion (CTE). This property can significantly reduce the alignment stability of the gain medium over ranges of environmental temperature and pump power.

Another conventional device includes a bonded absorbing side cladding that undesirably absorbs pump energy. Yet another conventional arrangement includes doped glass slides between gain elements, but again suffers from the cost and CTE mismatch drawbacks, in addition to increasing processing steps and complexity of the overall optical system. Still yet another conventional arrangement includes providing sensitizer ions in cladding region surrounding the gain medium for absorbing lasing wavelength entering the cladding, to suppress amplified spontaneous emission and parasitic lasing in a plane transverse to the lasing direction. However, this conventional approach still suffers from drawbacks as a substantial portion of the lasing wavelength entering the cladding region is not absorbed due to mismatches in the absorption spectrum of sensitizer ions and the emission spectrum of laser active ions in the gain medium, which are the source of the lasing wavelength, thereby causing parasitics to still exist substantially.

SUMMARY

According to one aspect of the present disclosure, an optical device is provided. The optical device includes a core region comprising a plurality of a first type of ions that absorb energy at a first wavelength and transfer the absorbed energy to a plurality of a second type of ions that lase at a second wavelength after receiving the transferred energy. The optical device includes a cladding region coupled to the core region comprising another plurality of the second type of ions that suppress parasitics in the optical device by absorbing energy of at least a transverse portion of the second wavelength that enters the cladding region.

According to another aspect of the present disclosure, a method of making a laser gain medium is provided. The method includes doping a first solid state host material with sensitizer ions that absorb energy at a first wavelength and laser active ions that lase at a second wavelength after receiving energy transferred from the sensitizer ions to form a core region, and doping a second solid state host material with the laser active ions to form a cladding region, the laser active ions suppressing parasitics in the laser gain medium by absorbing energy of at least a transverse portion of the second wavelength that enters the cladding region. The method includes bonding the first and the second solid state host materials to form the laser gain medium.

According to yet another aspect of the present disclosure, method for suppressing parasitics in a laser device is provided. The method includes exposing a concentration of sensitizer ions in a core region of the laser device to electromagnetic radiation at a first wavelength to excite the sensitizer ions from a first ground state to a first excited state. The method includes providing a first concentration of laser active ions in the core region at a second ground state, wherein the laser active ions are being excited to a second excited state by receiving energy from the excited sensitizer ions when the excited sensitizer ions return to the first ground state from the first excited state, the laser active ions lasing at a second wavelength when returning to the second ground state from the second excited state after the receiving. The method includes providing a second concentration of laser active ions in a cladding region at least partially surrounding the core region, the second concentration of laser active ions suppressing parasitics by absorbing energy in at least a portion of the second wavelength entering the cladding region.

Other features of one or more aspects of the present disclosure will become apparent from the following detailed description, accompanying drawings, and the appended claims.

BRIEF DESCRIPTION OF THE DRAWINGS

Various aspects of the disclosure will now be disclosed, by way of example only, with reference to the accompanying schematic drawings and flowcharts in which corresponding reference symbols indicate corresponding parts, in which.

DETAILED DESCRIPTION

Figure 1:
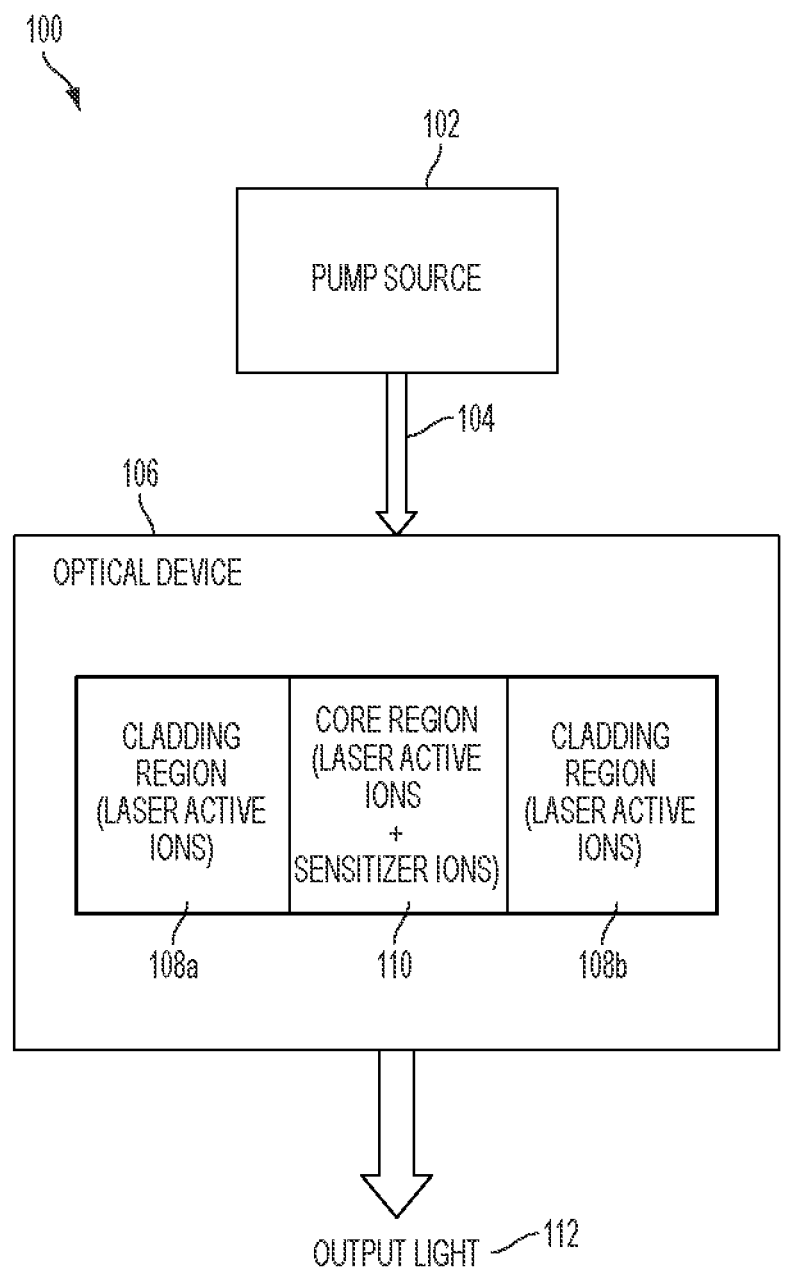
FIG. 1 illustrates a partly functional and partly schematic block diagram of an optical system, in accordance with an aspect of the present disclosure.

Referring to FIG. 1, optical system 100 in accordance with an aspect of this disclosure is illustrated. Optical system 100 includes pump source 102 coupled optically to an optical device 106. Pump source 102 comprises a laser source (not shown) outputting pump beam 104 at a first wavelength. By way of example only and not by way of limitation, the first wavelength can be in a range of 920-960 nm, and the laser source used in pump source 102 can be a semiconductor laser operating in this range of wavelength. Since lasers used for pump sources are known to those of ordinary skill in the art, such laser devices that can be used for pump source 102 will not be described in detail herein. In addition, pump source 102 includes other electronic and optical components known to those of ordinary skill in the art. Pump source 102 can include pump diode arrays, for example, a 940 nm 3-halfbar stack (5 mm wide) provided by Lasertel of Tucson, Ariz., although pump sources provided by other vendors may be used. In one exemplary arrangement, pump source 102 can be used in an end-pumping or side-pumping arrangement to reduce sensitivity of optical system 100 to pump wavelength. It is to be noted that although in the block diagram of optical system 100, pump source 102 is shown outside optical device 106, in alternative aspects of the disclosure, pump source 102 may be integrated with, and/or be inside optical device 106.

In one aspect of the disclosure, pump beam 104 is provided to optical device 106 incident at first cladding region 108a of optical device 106, although pump beam 104 may be incident upon other components of optical device 106, for example, collimating optics, beam splitters, focusing lenses, and the like. In an alternative aspect of the disclosure, pump beam 104 may be incident upon second cladding region 108b. As noted above, pump beam 104 can be in a wavelength range 920-960 nm, although other suitable wavelengths and/or wavelength ranges may be used. For example, in one aspect of the disclosure, pump beam 104 is substantially at 940 nm, when accounted for a linewidth and other drift parameters inherently associated with a wavelength of pump beam 104 (e.g., the first wavelength), although other suitable optical wavelengths may be used (e.g., any wavelength in the range 920-960 nm). In one aspect of the disclosure, pump beam 104 is at a wavelength suitable to pump sensitizer ions present in core region 110 of optical device 106, such that cladding regions 108a and 108b are substantially lossless or transparent to passage of pump beam 104. In other words, laser active ions present in cladding regions 108a and 108b do not absorb pump beam 104 from pump source 102. Pump beam 104 passes through at least one of cladding regions 108a and 108b, depending upon an arrangement of pump source 102 relative to optical device 106, to excite or pump sensitizer ions present in core region 110.

In one aspect of the disclosure, core region 110 and cladding regions 108a and 108b form a monolithic slab in which core region 110 forms a laser gain medium. In another aspect of the disclosure, optical device 106 is a laser device that outputs a laser beam at a second wavelength, different from the first wavelength of pump beam 104. In addition, optical device 106 can include components not explicitly shown in FIG. 1. For example, optical device 106 can include E-wave coatings on cladding regions 108a and 108b for coupling one or more heat sink devices to optical device 106, for dissipating heat. Further, optical device 106 can comprise optical, electronic, mechanical, opto-mechanical, and/or electro-mechanical components for various functions such as focusing pump beam 104, impedance matching devices, aligning components, and the like. By way of example only and not by way of limitation, such components can include shutters, lenses, beam splitters, optical and electronic filters, couplers, optical fibers, windows, static and movable mirrors, prisms, optical coatings, glass slabs, thin films, light emitting diodes (LEDs), piezoelectric or other motion control devices, collimators, pins, bayonets, photoelectric cells, slides, cover slips, retardation plates, wave-plates, counters, and/or other additional components useful in assembly and function of optical system 100. When used as a part of optical system 100, optical device 106 can be further coupled to a processor and a memory device (not shown) for carrying out analysis of output of optical device 106. Such a processor can be a part of a computing device and can be configured to execute instructions residing upon the memory device. Further, in one aspect of the disclosure, optical device 106 is coupled to an oscilloscope or other form of display to aid a technician in carrying out analysis of various parameters associated with optical system 100, as can be contemplated by one of ordinary skill in the art in view of this disclosure. In one aspect of the disclosure, optical device 106 and/or pump source 102 can be operating on an optical table, bench, or rail (not shown) made of steel with a thick honeycomb lattice structure for supporting various components of optical system 100.

At least one of cladding regions 108a and 108b is arranged to receive pump beam 104. Cladding regions 108a and 108b are doped with a concentration of ions that do not absorb pump beam 104. Cladding regions 108a and 108b at least partially surround core region 110. In one aspect of the disclosure, cladding regions 108a and 108b can completely surround core region 110, for example, as in a cylindrical geometry of an optical fiber. In such an arrangement, only one cladding region exists since cladding regions 108a and 108b are merged into a single cladding region with an annular ring type cross-sectional area. In another aspect of the disclosure, cladding regions 108a and 108b are doped with a concentration of laser active ions that absorb at least a portion of lasing wavelength from core region 110 of optical device 106 that enters cladding regions 108a and 108b, as discussed in detail below with respect to FIG. 2. As also discussed in detail with respect to FIGS. 2-7, core region 110 may be doped with a concentration of laser active ions similar to the laser active ions in cladding regions 108a and 108b, and additionally, with a concentration of another type of ions, referred to as sensitizer ions herein, for absorbing pump beam 104 for excitation. Excitation of sensitizer ions in core region 110 causes the laser active ions to lase, resulting in an output beam 112 at a wavelength different from the wavelength of pump beam 104. This wavelength is also referred to herein as the lasing wavelength. In one embodiment of the disclosure, core region 110 can have gain in a transverse direction which can cause losses due to parasitics when the lasing wavelength enters cladding regions 108a and 108b. The concentration of laser active ions in cladding regions 108a and 108b is at a level controlled to absorb the light or radiation (and therefore, energy) along a transverse direction thereby resulting in suppression of parasitics in optical device 106. In an aspect of the disclosure, cladding regions 108a and/or 108b are devoid of any sensitizer ions. Output beam 112 can be used for additional pumping or other laser applications, as can be contemplated by one of ordinary skill in the art. In this example, output beam 112 has a wavelength substantially equal to 1534 nm when accounted for linewidth and other drift parameters inherently associated with generation of a laser wavelength, although other wavelengths may be used. At this wavelength, output beam 112 is safe to the human eye.

Figure 2:
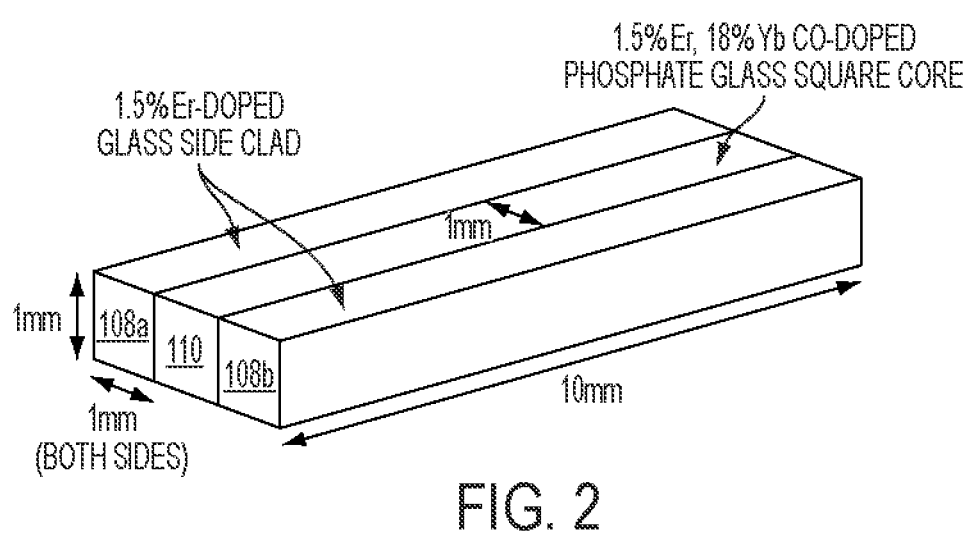
FIG. 2 illustrates an exemplary arrangement and structure of cladding regions and core region in an optical device, in accordance with an aspect of the disclosure.

Referring to FIG. 2, an exemplary arrangement and structure of cladding regions 108a and 108b and core region 110 is illustrated. It is to be noted that, although particular dimensions and a rectangular cross-section geometry of cladding regions 108a and 108b and core region 110 are illustrated in FIG. 2, one of ordinary skill in the art in view of this disclosure may contemplate other dimensions and geometries in which cladding regions 108a and 108b and core region 110 are structured and arranged. For example, cladding regions 108a and 108b and core region 110 may be in the form of a preform that can be pulled at a controlled rate to form at least a portion of a fiber laser device in a cylindrical geometry with a circular cross-section. Similarly, cladding regions 108a and 108b and core region 110 can be in the shape of slabs, as shown in FIG. 2, of different dimensions. In the example of FIG. 2, cladding regions 108a and 108b and core region 110 are each 1 mm×1 mm×10 mm in height, breadth, and length, respectively. The structure formed by core region 110 and cladding regions 108a and 108b can be pumped by pump beam 104 through one of the 1 mm×3 mm surfaces, with the 3 mm surface aligned with a slow axis of a pump diode array in pump source 102. The longer (3 mm) dimension in the slow axis reduces the brightness requirement for pump diodes in pump source 102 resulting in design flexibility of optical system 100. In one aspect of the disclosure, the slab is mounted and cooled on one or both of the large surfaces (3×10 mm). As a result of the exemplary arrangement shown in FIG. 2, optical device 106 provides a larger pump aperture for pump beam 104, as compared to providing pump beam 104 to core region 110 only. For example, in FIG. 2 a cross-section area of core region 110 is 1 mm$^2$ but a combined cross section area of core region 110 and cladding regions 108a and 108b is 3 mm$^2$. Advantageously, this results in more effective area utilization of pump beam 104 incident on optical device 106. It is to be noted that the direction of incidence of pump beam 104 as shown in FIG. 2 is by way of example only and not by way of limitation, and one of ordinary skill in the art will appreciate that pump beam 104 can be incident from any other direction (e.g., sideways instead of from the top). Similarly, based upon specific system design parameters of optical device 106 (e.g., placement of output lenses), output beam 112 can be emitted in other directions that are controllable by a designer of optical system 100.

In one aspect of the disclosure, cladding regions 108a and 108b and core region 110 form a monolithic laser gain medium. Cladding regions 108a and 108b can be made of phosphate glass or silicate glass host material, for example, Kigre QX/Er® phosphate glass host material or Kigre MM-2® glass host material provided by Kigre, Inc. of Hilton Head, S.C. Alternatively, glass host material Schott LG-910® provided by Schott of Mainz, Germany could be used. Other solid state host materials such as those provided by NP Photonics of Tucson, Ariz., or other glass from other manufacturers may be used. Similarly, core region 110 can be made of phosphate glass or silicate glass host material thermally matched with the glass material used for cladding regions 108a and 108b, for example those provided by the above-noted manufacturers or other vendors. In one aspect of the disclosure, core region 110 includes one group of sensitizer ions at a first doping concentration that can be excited from a ground state to an excited state by pump beam 104. In addition, core region 110 also includes a second group of laser active ions at a second concentration that get excited from a ground state to an excited state by energy transfer from the sensitizer ions when the sensitizer ions return to the ground state. The process of energy transfer from sensitizer ions to laser active ions in core region 110 is described in detail with respect to FIG. 3. In an aspect of the disclosure, cladding regions 108a and 108b are doped with a concentration of laser active ions only, with no sensitizer ions being present in cladding regions 108a and 108b. Since laser active ions are transparent to pump beam 104, pump beam 104 can travel without any loss through cladding regions 108a and/or 108b before reaching gain medium in core region 110. At the same time, doping cladding regions 108a and 108b with laser active ions facilitates suppression of parasitics resulting from a portion of lasing output beam 112 that enters cladding regions 108a and 108b, as discussed below.

By way of example only, core region 110 comprises trivalent Erbium ions ($Er^{3+}$) from $Er_2O_3$ as the laser active ions and trivalent Ytterbium ions ($Yb^{3+}$) from $Yb_2O_3$ as the sensitizer ions that absorb energy from pump beam 104, although other types of laser active ions such as Holmium (Ho) ions and sensitizer ions such as Thulium™ ions may be used. Further by way of example only, laser active $Er^{3+}$ ions present in core region 110 may have a doping concentration of about 1.5% by weight. Sensitizer ions $Yb^{3+}$ present in core region 110 may have a doping concentration of about 18% by weight. In alternative aspects of the disclosure, other doping concentrations and ranges for core region 110 could be used, for example, $Er^{3+}$ ions could be present in a range of 0.5-3% and $Yb^{3+}$ ions can be present in a range of 6-18% by weight. Cladding regions 108a and 108b comprise only laser active ions $Er^{3+}$ from $Er_2O_3$ with a doping concentration of 1.5% by weight $Er^{3+}$ ions. In alternative aspects of the disclosure, other doping concentrations and ranges for cladding regions 108a and 108b could be used, for example, $Er^{3+}$ ions could be present in a range of 0.5-3% in cladding regions 108a and 108b. Further, doping concentrations of the ions in core region 110 and cladding regions 108a and 108b can be controlled and modified such that core region 110 and cladding regions 108a and 108b have matching coefficients of thermal expansion (CTE). In addition, core region 110 and cladding regions 108a and 108b may have additional matching characteristics such as thermal conductivity or refractive index. In one aspect of the disclosure, pump beam 104 is confined to wavelengths that are absorbed only by the sensitizer ions (e.g., $Yb^{3+}$ ions) such that the laser-active ions (e.g., $Er^{3+}$ ions) will be excited in core region 110 by absorbing energy from excited $Yb^{3+}$ ions, but not in cladding regions 108a and/or 108b. The laser-active ions in cladding regions 108a and/or 108b will remain unexcited and therefore, will absorb fluorescence generated in core region 110, thereby suppressing parasitics in the laser gain medium of optical device 106.

Additionally, use of laser-active-ion-doping in cladding regions 108a and/or 108b advantageously supports same host material (e.g., phosphate, silicate, or the like) for both core region 110 and cladding regions 108a and 108b making the arrangement shown in FIG. 2 ideal for CTE matching. Furthermore, since laser active ions, and not sensitizer ions, are present in cladding regions 108a and 108b, transmission of pump beam 104 can be carried out without loss while at the same time be useful in parasitic suppression in the co-doped gain medium forming core region 110. According to one aspect of the disclosure, parasitics in the co-doped laser gain medium formed in core region 110 are suppressed since the pump bands of the two ion species (laser active and sensitizer ions) do not completely overlap. For example, the sensitizer ions can be a two-level system, whereas the laser active ions can be a three-level or a quasi-three-level energy system, as discussed below with respect to FIG. 3-5.

Although not shown in FIG. 2, the 3×10 mm surface(s) of glass slab including core region 110 and cladding regions 108a and 108b can have different configurations. For example, an E-wave coating would be applied to one or both of the 3×10 mm surfaces and the slab for "dry" mounting (soldered or with a non-adhesive thermo-optical interface material). Alternatively, a thin layer of optical adhesive (such as EPO-TEK OG134® provided by Epoxy Technology, Inc. of Billerica, Mass.) could be used to bond the monolithic slab to the heat sink device(s). In this configuration, the resonator mirror coating would be applied to the 1×3 mm surface through which pump beam 104 enters. For example, an E-wave coating, or alternatively an optical adhesive, provides a protective layer on the monolithic slab that allows the wavelength corresponding to pump beam 104 to be substantially 100% reflective (e.g., 99.9% reflective) at the second wavelength (lasing wavelength corresponding to output beam 112) as a result of total internal reflection at a boundary between the E-wave coating (or optical adhesive) and core region 110 and cladding regions 108a, and 108b on which the E-wave coating (or optical adhesive) is applied. By way of example only, the E-wave coating could be a 3-4 micron thick layer of $SiO_2$ as provided by TwinStar Optics, Coatings, and Crystals of New Port Richey, Fla.

Figure 3:
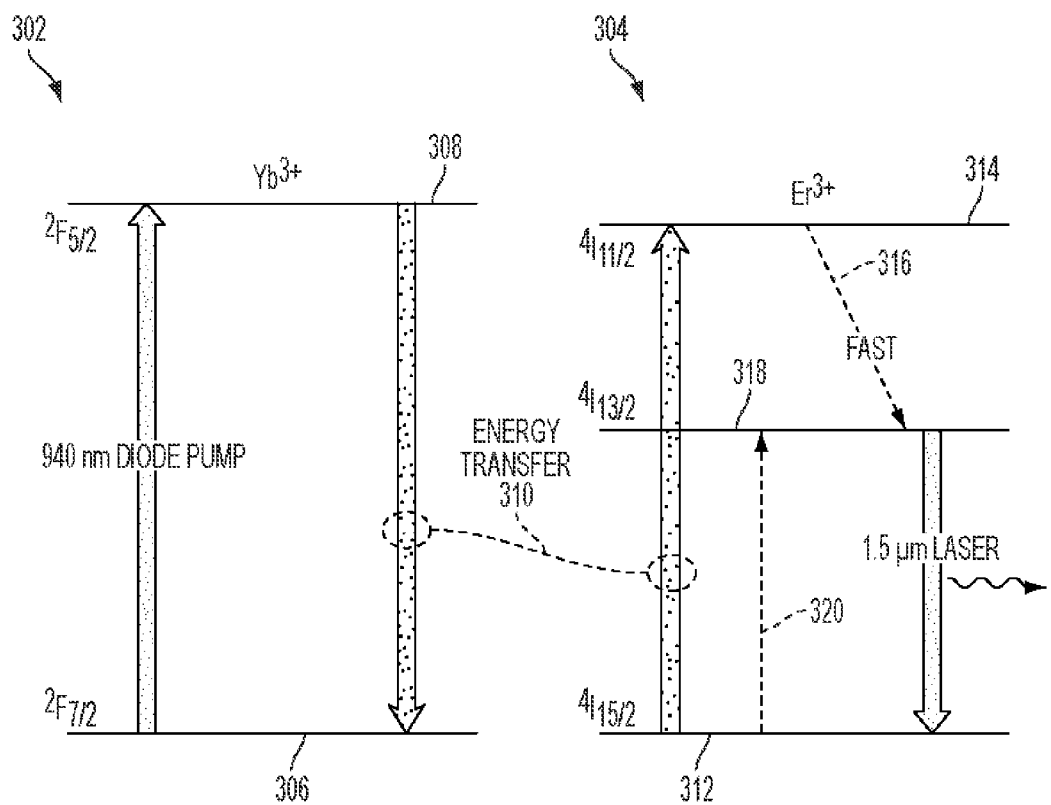
FIG. 3 illustrates a two level energy system of sensitizer ions and a three level or quasi-three-level energy system of laser active ions.
Figure 4:
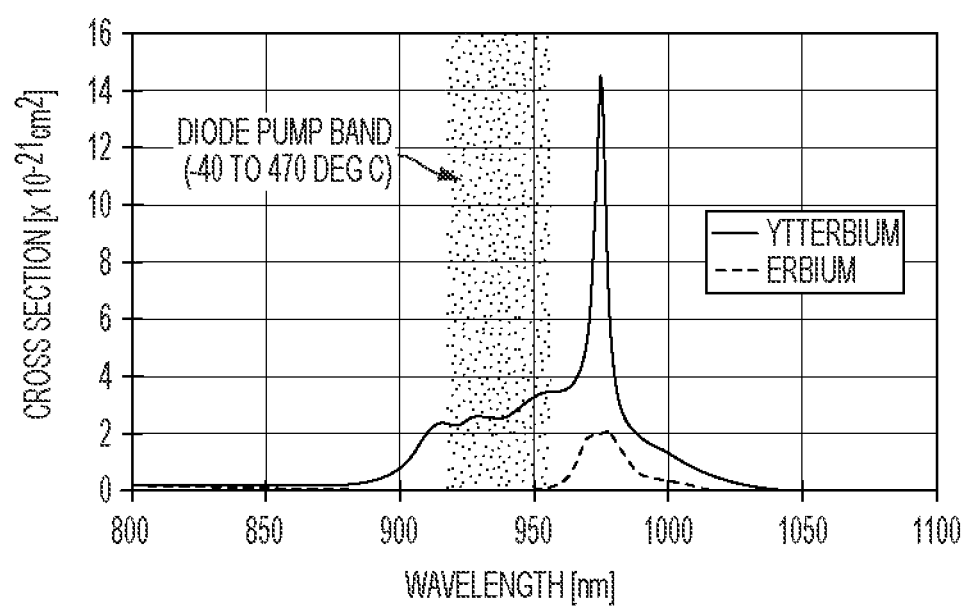
FIG. 4 illustrates absorption spectra of the sensitizer ions and laser active ions.

Referring to FIG. 3, a simplified $Er^{3+}$, $Yb^{3+}$ energy level system is illustrated. System 302 is a two-level $Yb^{3+}$ system and system 304 is a three-level or a quasi-three-level system. It is to be noted although $Er^{3+}$ and $Yb^{3+}$ systems are illustrated in FIG. 3, other equivalent and suitable two-level, three-level, quasi-three-level, and/or higher-level lasing systems may be used for different wavelengths of pump beam 104 and output beam 112. For example, other two-level and three-level or quasi-three-level sources may include Ho, Tm ion systems. When pump beam 104 is incident on system 302, $Yb^{3+}$ ions in core region 110 in a ground state 306 transition to an excited energy level 308 by absorption of energy from pump beam 104. In this example, pump beam 104 is at a wavelength substantially equal to 940 nm. By a cross-relaxation process, excited $Yb^{3+}$ ions in core region 110, when returning back to ground state 306, transfer energy to $Er^{3+}$ ions in core region 110 that are in a ground state 312. The cross-relaxation process is symbolically shown by a chained curve 310. Since cross-relaxation energy processes generally are known, they will not be described in detail herein. Upon receiving energy from the $Yb^{3+}$ ions returning to ground state 306, $Er^{3+}$ ions in core region 110 transition to an excited state 314. Since $Er^{3+}$ ions form the three-level or the quasi-three-level system 304, excited $Er^{3+}$ ions in excited state 314 do not directly return to ground state 312. Instead, excited $Er^{3+}$ ions in excited state 314 return via a relatively fast process shown by an arrow 316 to an intermediate energy state 318, before finally returning to ground state 312, and emit photons lasing at the second wavelength (in this example, at about 1534 nm). It is these lasing photons that form output beam 112 emanating from core region 110. Since cladding regions 108a and 108b do not have any sensitizer ions that can absorb pump beam 104 (e.g., no $Yb^{3-}$ ions), but only have laser active ions (e.g., $Er^{3+}$ ions), pump beam 104 passes through cladding regions 108a and 108b without any significant loss in energy. This is further understood from FIG. 4 that shows absorption spectra of $Er^{3+}$ and $Yb^{3+}$ ions at different wavelengths. For example, $Er^{3+}$ ions present in cladding regions 108a and 108b show no absorption of electromagnetic energy in 920-960 nm range, which is advantageous in many applications where temperature control of pump diodes in pump source 102 is difficult. The laser active ions ($Er^{3+}$ ions) in core region 110 show similar characteristics and do not absorb energy from pump beam 104. The absorption spectra shown in FIG. 3 also shows $Yb^{3+}$ ions present in core region 110 being capable of absorbing energy at pump wavelengths in the range 920-960 nm from pump beam 104.

Figure 5:
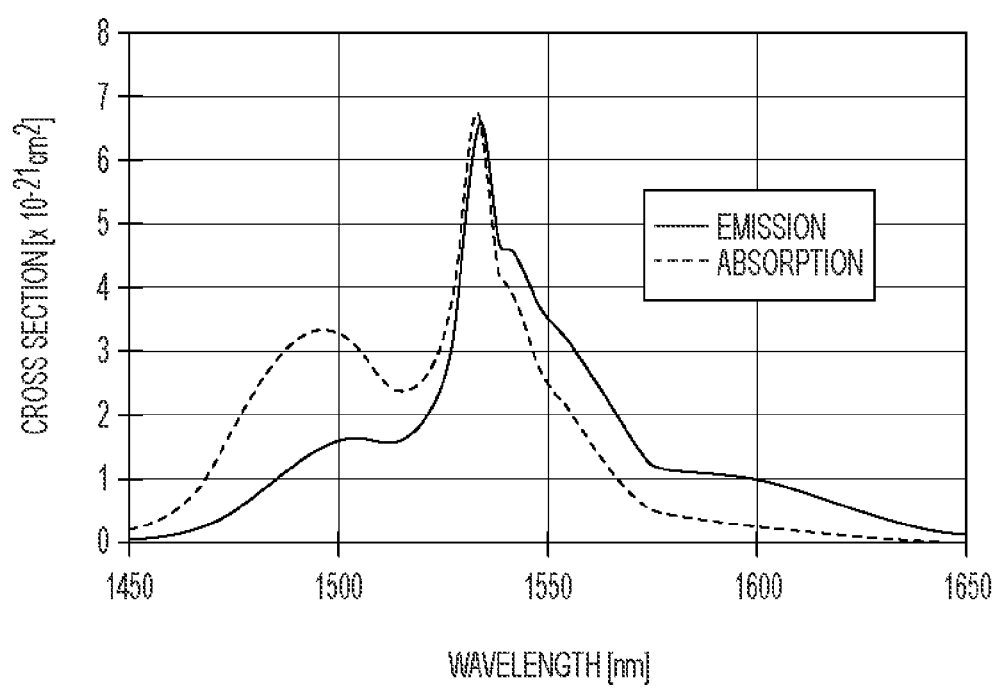
FIG. 5 illustrates matching between emission and absorption spectra of the laser active ions.

However, referring back to FIG. 3, $Er^{3+}$ ions present in cladding regions 108a and 108b can absorb any portion of energy from the lasing photons in core region 110 by absorbing the light that propagates along a transverse direction to excite $Er^{3+}$ ions in cladding regions 108a and 108b to intermediate energy state 318, as shown by an arrow 320. This is better understood from substantially matching emission and absorption spectra of $Er^{3+}$ ions shown in FIG. 5. For example, FIG. 5 illustrates $Er^{3+}$ ions to be capable of absorbing wavelength at or about 1534 nm, as shown in the absorption peak, which matches the emission peak of $Er^{3+}$ ions in core region 110 that emit output beam 112. As a result of such absorption, parasitic light that enters cladding regions 108a and 108b is removed, thus reducing or suppressing parasitics in laser gain medium of optical device 106. Absent the doping of cladding regions 108a and 108b with laser active ions (e.g., $Er^{3+}$ ions), light entering cladding regions 108a and 108b gets totally internally reflected (since air has a refractive index approximately equal to 1), and can loop around indefinitely stealing gain from useful longitudinal portion of output beam 112 and transferring it to parasitic transverse portion that enters cladding regions 108a and 108b. Therefore, by doping host material of cladding regions 108a and/or 108b with laser active ions and core region 110 with both laser active and sensitizer ions, various aspects of this disclosure suppress parasitics in a laser gain medium forming core region 110 by absorbing energy of at least a transverse portion of output beam 112 at a lasing wavelength (e.g., 1534 nm), after sensitizer ions have been pumped at a pump wavelength by pump beam 104 for transferring energy to the laser active ions in core region 110 such that the parasitic transverse portion does not gain energy indefinitely by passing through core region 110 again and again.

Further, the monolithic slab arrangement shown in FIG. 2 advantageously facilitates mounting and alignment of optical device 106, and provides better cooling characteristics since optical device 106 can dissipate heat via heat-sink on surface area larger than that of a device using only core region 110 as a gain medium with no cladding. Additionally, a wide slow-axis aperture of the co-doped slab accommodates lower-brightness diodes resulting in lower pump energies and flexible resonator design. Furthermore, laser-active-ion-doped side cladding eliminates the need for parasitic side treatments, thereby reducing costs.

Figure 6:
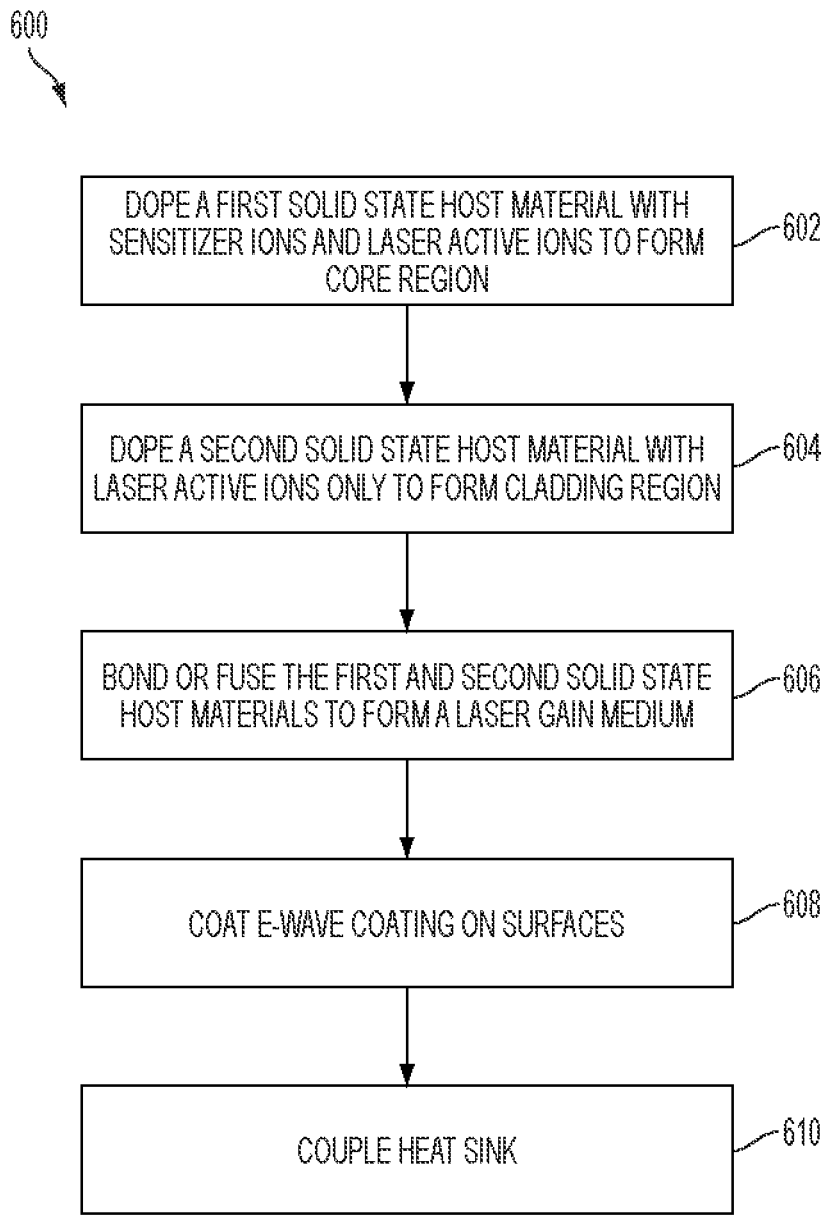
FIG. 6 illustrates a flowchart for a method of making a laser gain medium, in accordance with an aspect of the disclosure.

Referring to FIG. 6, a method of making a laser gain medium is illustrated using flowchart 600, in accordance with an aspect of the disclosure, with reference to FIGS. 1-5. Flowchart 600 begins at procedure 602 where doping a first solid state host material with sensitizer ions (e.g., $Yb^{3+}$ ions) and laser active ions (e.g., $Er^{3+}$ ions) is carried out. The co-doped solid state host material forms the laser gain medium of core region 110 of optical device 106, and can be, by way of example only, a phosphate or a silicate host material. The solid state host material is described as "co-doped" since two different types of ion species, sensitizer and laser active, are doped in the same host material. The sensitizer ions absorb energy at a first wavelength that is a pump wavelength to transition to an excited state (e.g., excited state 308 of FIG. 3). The laser active ions receive energy transferred from the sensitizer ions, when the sensitizer ions return to the unexcited state (e.g., ground state 306). Upon receiving the energy through cross-relaxation or other energy transfer processes, the laser active ions transition to an excited state (e.g., excited state 314) only to return back to ground state 312 via intermediate state 318. When returning from intermediate state, laser active ions emit lasing photons at a lasing wavelength (e.g., 1534 nm) to form output beam 112.

The flow of flowchart 600 then proceeds to procedure 604 where doping a second solid state host material with the laser active ions to form cladding regions 108a and/or 108b. The second solid state host material can be, by way of example only, a phosphate or a silicate host material. The laser active ions in cladding regions 108a and/or 108b are capable of suppressing parasitics in the laser gain medium of optical device 106 by absorbing energy of at least a transverse portion of the wavelength of lasing photons of output beam 112 from core region 110 in procedure 602, that enters cladding regions 108a and/or 108b. As noted above, the absorption of transverse portion of output beam 112 generated in core region 110 occurs by the laser active ions in cladding regions 108a and/or 108b transitioning in energy from ground state 312 to intermediate excited state 318 and/or excited state 314. In one aspect of the disclosure doping concentration of laser active ions in the first solid state host material forming core region 110 is equal to the doping concentration of the laser active ions in the second solid state host material forming the cladding regions 108a and 108b.

The flow then proceeds to procedure 606 where bonding the first and the second solid state host materials to form the laser gain medium of optical device 106. The bonding is carried out in a manner to ensure matching of CTEs and/or other characteristics (e.g., thermal conductivity or refractive index) of the first and the second host materials. In one aspect of the disclosure, unbonded cladding regions 108a and/or 108b and core region 110 may form a preform for pulling into a fiber at a controlled rate. Cladding regions 108a and 108b can partially or fully surround core region 110.

The flow proceeds to procedure 608 where coating at least one surface of the first and second solid state host materials with an E-wave coating that thermally couples a heat sink device to cladding regions 108a and/or 108b is carried out. The E-wave coating is about 100% reflective at the first wavelength as a result of total internal reflection at the boundary between the E-wave coating and cladding regions 108a and 108b. Since various E-wave coatings have been described above, such description is not repeated here.

The flow then proceeds to procedure 610 where coupling the heat sink to cladding regions 108a and/or 108b is carried out. Once coupled with the heat sink device, optical device 106 may be used for generating lasing output beam 112 by exposure of the E-wave coating to pump beam 104 (e.g., at 940 nm). In addition to coupling the heat sink device, procedure 610 can additionally include performing alignment of optical components, balancing impedance and other optimization procedures for optical device 106.

Figure 7:
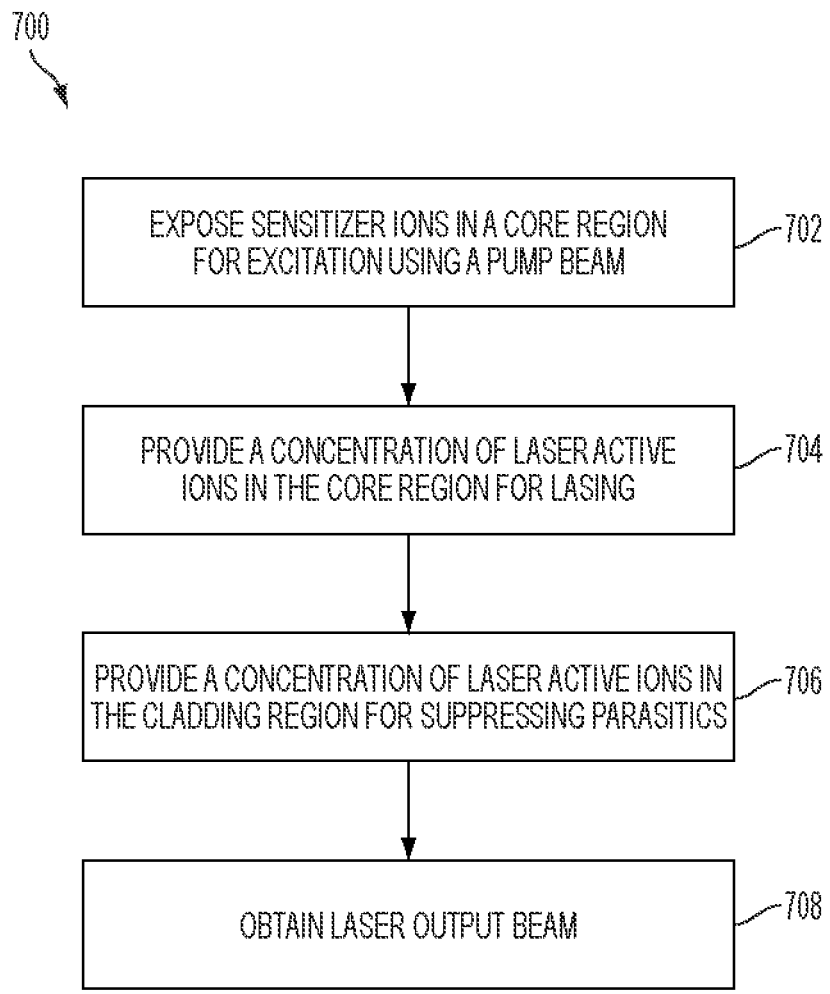
FIG. 7 illustrates a flowchart of a method for suppressing parasitics in a laser device, in accordance with an aspect of the disclosure.

Referring to FIG. 7, a method for suppressing parasitics in a laser device is illustrated using flowchart 700, in accordance with an aspect of the disclosure, with reference back to FIGS. 1-5. Flowchart 700 begins at procedure 702 where exposing a concentration of sensitizer ions in core region 110 of the laser device to electromagnetic radiation at a first wavelength is carried out using pump beam 104. The exposing excites the sensitizer ions from ground state 306 to excited state 308. At procedure 704, providing a first concentration of laser active ions in core region 110 at ground state 312 is carried out. The laser active ions are excited to excited state 314 by receiving energy from the excited sensitizer ions when the excited sensitizer ions return to ground state 306 from excited state 308, the laser active ions lasing at a second wavelength when returning to ground state 312 from excited state 314 after the receiving is carried out. At procedure 706, providing a second concentration of laser active ions in cladding regions 108a and/or 108b at least partially surrounding core region 110 is carried out. The second concentration of laser active ions suppress parasitics by absorbing energy in at least a portion of the second wavelength entering cladding regions 108a and/or 108b. In one aspect of the disclosure, cladding regions 108a and/or 108b are devoid of sensitizer ions, and comprise laser active ions only. Finally, at procedure 708, output beam 112 lasing at the second wavelength (e.g., 1534 nm) is obtained.

Generally, flowcharts 600 and 700 shown in FIGS. 6 and 7 are representative of, for example, a method of making optical device 106 and laser gain medium therein, and for suppressing parasitics in a laser device (e.g., optical device 106), as shown in FIGS. 1-2. Various operations or procedures shown in flowcharts 600 and 700 can be facilitated by one or more processors and peripheral devices on which machine readable instructions reside, for example, in a memory device coupled to the one or more processors. Also, some portions of the procedures represented by the methods of flowcharts 600 and 700 of FIGS. 6 and 7 may be implemented manually at an optical bench, or may be carried out in a process controlled environment (e.g., a micro-fabrication laboratory) operated by a user. Further, although the example procedures of the methods are described with reference to flowcharts 600 and 700, persons of ordinary skill in the art after reading this disclosure will readily appreciate that other methods of implementing the methods of making a laser gain medium, and suppressing parasitics in a laser device, respectively, may alternatively be used. For example, the order of execution of the blocks in flowcharts 600 and 700 may be changed, and/or some of the blocks described may be changed, eliminated, or combined. Further, more blocks may be added, for example, when carrying out forming of a preform using core region 110 and cladding regions 108a and 108b, and pulling the preform at a controlled rate to form a fiber laser device from optical device 106.

While the present disclosure has been described in connection with specific aspects, it is to be understood that the inventive concept is capable of further modifications, and is not to be limited to the disclosed aspects, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential hereinbefore set forth and followed in the spirit and scope of the appended claims.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one aspect of the disclosure, the structural components illustrated herein are drawn to scale. It is to be expressly understood, however, that the drawings are for the purpose of illustration and description only and are not a limitation. In addition, it should be appreciated that structural features shown or described in any one aspect herein can be used in other aspects as well. As used in the specification and in the claims, the singular form of "a", "an", and "the" include plural referents unless the context clearly dictates otherwise.

What is claimed is:

1. An optical device, comprising:
a core region comprising a plurality of a first type of ions that absorb energy at a pumping wavelength and transfer the absorbed energy to a plurality of a second type of ions that lase at a lasing wavelength after receiving the transferred energy, wherein the first type of ions include sensitizer ions; and
a cladding region coupled to the core region comprising another plurality of the second type of ions that suppress parasitics in the optical device by absorbing energy of at least a transverse portion of the lasing wavelength that enters the cladding region, wherein the second type of ions include laser active ions and wherein the second type of ions are transparent to the pumping wavelength.

2. The optical device of claim 1, wherein the core region and the cladding region are arranged such that the cladding region at least partially surrounds the core region in a slab of rectangular or circular cross-sectional geometry.

3. The optical device of claim 1, wherein the first type of ions comprise a two level energy system and the second type of ions comprise a three level or a quasi-three level energy system.

4. The optical device of claim 1, wherein the first type of ions are trivalent Ytterbium ions ($Yb^{3+}$) and the second type of ions are trivalent Erbium ions ($Er^{3+}$).

5. The optical device of claim 4, wherein the core region is a co-doped phosphate glass host material with a doping concentration of about 1.5% by weight $Er^{3+}$ ions and about 18% by weight $Yb^{3+}$ ions, and the cladding region is an Erbium doped phosphate glass host material with a doping concentration of about 1.5% by weight $Er^{3+}$ ions.

6. The optical device of claim 1, wherein the core and the cladding regions are arranged to form a preform for an optical fiber pull.

7. The optical device of claim 1, wherein the pumping wavelength is substantially equal to 940 nm and the lasing wavelength is substantially equal to 1534 nm.

8. The optical device of claim 1, wherein the second type of ions have an emission spectrum matched to an absorption spectrum thereof for absorbing the energy of at least the transverse portion of the lasing wavelength that enters the cladding region.

9. The optical device of claim 1, wherein the first type of ions transfer the energy to the second type of ions by a cross-relaxation energy transfer process.

10. The optical device of claim 1, wherein the cladding region comprises an E-wave coating on at least one surface thereof that thermally couples a heat sink device to the cladding region, the E-wave coating being about 100% reflective at the pumping wavelength as a result of total internal reflection at the boundary between the E-wave coating and the cladding region.

11. A method of making a laser gain medium, comprising:
doping a first solid state host material with sensitizer ions that absorb energy at a pumping wavelength and laser active ions that lase at a lasing wavelength after receiving energy transferred from the sensitizer ions to form a core region; and
doping a second solid state host material with the laser active ions to form a cladding region, the laser active ions capable of suppressing parasitics in the laser gain medium by absorbing energy of at least a transverse portion of the second wavelength that enters the cladding region, wherein the laser active ions are transparent to the pumping wavelength; and
bonding the first and the second solid state host materials to form the laser gain medium.

12. The method of claim 11, wherein the core region and the cladding region have matched Coefficients of Thermal Expansion (CTEs).

13. The method of claim 11 further comprising:
coating at least one surface of the first and second solid state host materials with an E-wave coating for coupling a heat sink device to the cladding region, the E-wave coating being about 100% reflective at the pumping wavelength as a result of total internal reflection at the boundary between the E-wave coating and the cladding region; and
exposing the E-wave coating to electromagnetic radiation from a pump source substantially outputting at the pumping wavelength, the laser active ions being substantially transparent to the pumping wavelength incident thereupon in the cladding region.

14. The method of claim 11, wherein the sensitizer ions are trivalent Ytterbium ions ($Yb^{3+}$) and the laser active ions are trivalent Erbium ions ($Er^{3+}$).

15. The method of claim 11, wherein the first and the second solid state host materials are both either a phosphate based or a silicate based material.

16. The method of claim 11, wherein the bonding comprises:
arranging the cladding region to at least partially surround the core region.

17. The method of claim 11 further comprising:
forming a preform with the core and the cladding regions; and
pulling the preform at a controlled rate to form at least a portion of a fiber laser device.

18. The method of claim 11, wherein the doping the first solid state host material comprises doping to a concentration of about 1.5% by weight $Er^{3+}$ ions and about 18% by weight $Yb^{3+}$ ions, and wherein the doping the second solid state host material comprises doping to a concentration of about 1.5% by weight $Er^{3+}$ ions.

19. A method for suppressing parasitics in a laser device, comprising:
exposing a concentration of sensitizer ions in a core region of the laser device to electromagnetic radiation at a pumping wavelength to excite the sensitizer ions from a first ground state to a first excited state;
providing a first concentration of laser active ions in the core region at a second ground state, wherein the laser active ions are excited to a second excited state by receiving energy from the excited sensitizer ions when the excited sensitizer ions return to the first ground state from the first excited state, the laser active ions lasing at a lasing wavelength when returning to the second ground state from the second excited state after the receiving; and
providing a second concentration of laser active ions in a cladding region at least partially surrounding the core region, the second concentration of laser active ions suppressing parasitics by absorbing energy in at least a portion of the lasing wavelength entering the cladding region, wherein the second concentration of laser active ions are transparent to the pumping wavelength.

20. The method of claim 19, wherein the first wavelength is substantially equal to 940 nm and the second wavelength is substantially equal to 1534 nm.

21. The method of claim 19, wherein the sensitizer ions are trivalent Ytterbium ions ($Yb^{3+}$) and the laser active ions are trivalent Erbium ions ($Er^{3+}$).

22. The method of claim 21, wherein the core region is a co-doped phosphate glass host material with a doping concentration of about 1.5% by weight $Er^{3+}$ ions and about 18% by weight $Yb^{3+}$ ions, and the cladding region is an Erbium doped phosphate glass host material with a doping concentration of about 1.5% by weight $Er^{3+}$ ions.

23. The method of claim 19, wherein the laser active ions have an emission spectrum matched to an absorption spectrum thereof.

24. The method of claim 19, wherein the laser active ions have at least one excited state in addition to and at a higher energy state than the second excited state, such that the laser active ions are excited to the additional excited state and return to the second excited state prior to the lasing by returning to the second ground state.

25. The method of claim 19, wherein the absorbing at least the portion of the lasing wavelength entering the cladding region occurs in a direction transverse relative to a direction of propagation of electromagnetic radiation at the lasing wavelength in the core region.

26. The method of claim 19, wherein the cladding region is devoid of the sensitizer ions.

27. The method of claim 19, wherein the first concentration is equal to the second concentration.

* * * * *